United States Patent [19]

Yomoda et al.

[11] Patent Number: 4,906,831

[45] Date of Patent: Mar. 6, 1990

[54] OPTICAL PICKUP DRIVE DEVICE

[76] Inventors: Kenju Yomoda, 2-1-205, Gorikida 3-chome, Asao-ku, Kawasaki-shi, Kanagawa 215; Osamu Aizawa, 9-15, Narita-Nishi 2-chome, Suginami-ku, Tokyo 166, both of Japan

[21] Appl. No.: 301,104

[22] Filed: Jan. 25, 1989

[51] Int. Cl.⁴ .............................................. G01J 1/20
[52] U.S. Cl. ................. 250/201.5; 350/255; 369/45
[58] Field of Search .............. 250/201 DF, 216; 369/44, 45, 46; 350/255, 252, 247

[56] References Cited

U.S. PATENT DOCUMENTS 4,555,780 11/1985 Koide ........................... 250/201 DF
4,661,943 4/1987 Ikeda ..................................... 369/46
4,813,033 3/1989 Baasch et al. ...................... 350/255

*Primary Examiner*—David C. Nelms
*Attorney, Agent, or Firm*—Staas & Halsey

[57] ABSTRACT

An optical pickup drive device has first through third reference plates parallel to each other and interconnected by three or fourth pivotal support members or connecting arms by which the first through third reference plates are pivotally supported. An optical pickup is mounted on the first reference plate. Drive mechanisms for driving the optical pickup in directions parallel to the second reference plate are disposed on the first and third reference plates, or the pivotal support members. With this arrangement, the drive device allows the optical pickup to read a signal with stable accuracy against external vibrations and shocks applied to the drive device.

19 Claims, 5 Drawing Sheets

OPTICAL PICKUP DRIVE DEVICE

BACKGROUND OF THE INVENTION

1. Field of the Invention

The present invention relates to a drive device for correcting the position of an optical pickup which operates to record a signal on an optical storage medium or reads a recorded signal from an optical storage medium.

2. Description of the Prior Art

For reading a recorded signal from an optical storage medium such as a compact disc, a laser disc, or the like (hereinafter referred to as a "disc"), a laser beam is applied to the disc which is being rotated, and a light beam reflected from a mirror-finished surface of the disc is detected by an optical pickup comprising a light detector and converted thereby into an electric signal.

The mirror-finished reflecting surface of the disc is not strictly planar, but has surface irregularities due to disc distortion. Moreover, the axis of rotation of the disc may not lie parallel to the rotational shaft of a device for rotating the disc. Therefore, the distance between the optical pickup and the reflecting surface of the disc tends to vary or fluctuate, with the result that the signal received by the optical pickup is liable to become unstable. Where the axis of rotation of the disc at the time the disc is played back is eccentrically displaced with respect to the axis of rotation of the disc at the time the signal is recorded on the disc. The reflected light beam is horizontally displaced with respect to the light detecting surface of the optical pickup, making the signal detection also unstable.

To solve the above problems, it is necessary for the optical pickup to be translatable vertically and horizontally in response to displacements of the mirror-finished reflecting surface of the disc.

Various known translating mechanisms which have been put to use will be described with reference to FIGS. 1(A) through 1(C) of the accompanying drawings.

The translating mechanism shown in FIG. 1(A) has a movable assembly 41 which includes an objective lens 1 for receiving a reflected light beam, a vertical driver coil 12 for vertically driving the objective lens 1, and a horizontal driver coil 13 for horizontally driving the objective lens 1, the movable assembly 41 being horizontally movable supported on resilient support plates 47. The translating mechanism as a whole is vertically movably connected to a base plate 42 by resilient support plates 43. The vertical driver coil 12 and the horizontal driver coil 13 are placed in an external magnetic field. The movable assembly 41 can be moved vertically by passing an electric current through the vertical driver coil 12, and can be moved horizontally by passing an electric current through the horizontal driver coil 13. The translating mechanism of this construction is disclosed in Japanese Laid-Open Utility Model Publication No. 60-155023.

In FIG. 1(B), a translating mechanism includes a movable member 41 made of a magnetic material and supporting an objective lens 1 on one end and an electromagnetic coil 45 on the other end, the movable member 41 being rotatably supported on a shaft 46. Two permanent magnets 44 are disposed in closely spaced relation to the end of the movable member 41 near the electromagnetic coil 45. The permanent magnets 44 have magnetic poles of opposite polarities confronting the movable member 41.

When the electromagnetic coil 45 is not energized, the movable member 41 is held in an intermediate position between the two permanent magnets 44. The movable member 41 can be rotated in one direction by passing an electric current through the electromagnetic coil 45 in one direction. The movable member 41 can then be rotated in the opposite direction by passing an electric current through the electromagnetic coil 45 in the opposite direction. The translating mechanism shown in FIG. 1(B) is disclosed in Japanese Laid-Open Utility Model Publication No. 58-163908.

FIG. 1(C) also shows another conventional translating mechanism. A movable assembly 41 composed of an objective lens 1, a vertical driver coil 12, and a horizontal driver coil 13 is rotatably supported on a shaft 46. The movable assembly 41 can be rotated horizontally by energizing the horizontal driver coil 13, and vertically by energizing the vertical driver coil 12. This translating mechanism is shown in Japanese Laid-Open Utility Model Publication No. 61-37127.

However, the mass moment of the movable component in each of the above conventional translating mechanisms is not in equilibrium in at least one of the vertical and horizontal directions. Therefore, the movable assembly or member 1 tends to be positionally displaced by external vibration or shocks applied to the mechanism. With the mechanisms shown in FIGS. 1(A) and 1(C), a bias voltage has to be applied to the vertical driver coil 12 in order to hold the movable assembly 41 in a vertically neutral position against gravity, resulting in increased electric power consumption.

SUMMARY OF THE INVENTION

According to the present invention, a drive device comprises at least three pivotal support members having opposite ends pivotally supporting first and third reference plates, the pivotal support members being parallel to each other and having the same length, a second reference plate pivotally supported by the pivotal support members at positions equally spaced from the opposite ends of the pivotal support members, horizontal drive coils for horizontally driving the first and third reference plates, and vertical driver coils for vertically driving the first and third reference plates. The mass moment of the first reference plate with respect to the second reference plate is equal to the mass moment of the third reference plate with respect to the second reference plate. When the drive device is subjected to external vibrations or shocks, the sum of inertial forces acting on the first and third reference plate acts on the pivotal support members, and no rotational forces are produced. The mutual positional relationship between the first, second, and third reference plates remains unchanged by the applied vibrations or shocks. Since gravity-induced moments on the first and third reference plates are vertically kept in equilibrium with respect to the second reference plate, no bias voltage is required to be applied to hold the first reference plate in a neutral position, and the consumption of electric power by the drive device is lowered.

The accuracy for positioning the first reference plate can be increased by selecting the distance between the first and second reference plates to be greater than the distance between the second and third reference plates and controlling the movement of the third reference plate.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1A:
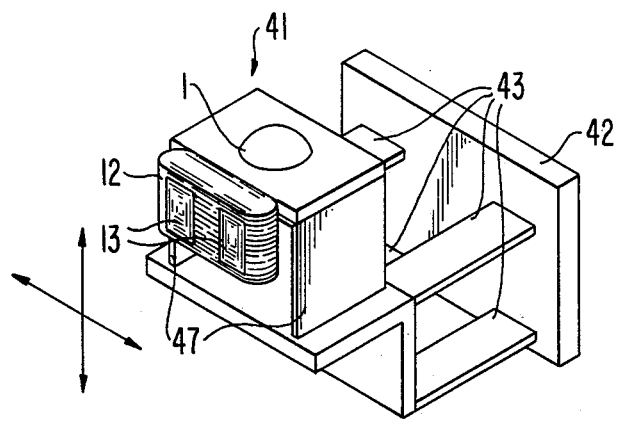
FIGS. 1(A), 1(B) and 1(C) are views showing conventional devices for moving an optical pickup.
Figure 1B:
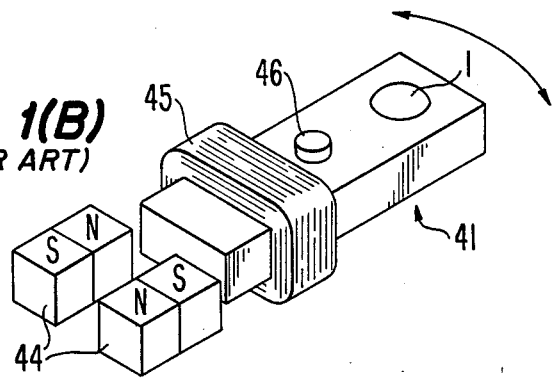
Figure 1C:
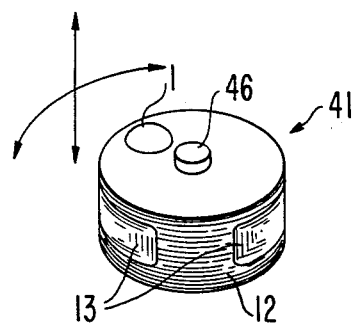
Figure 2:
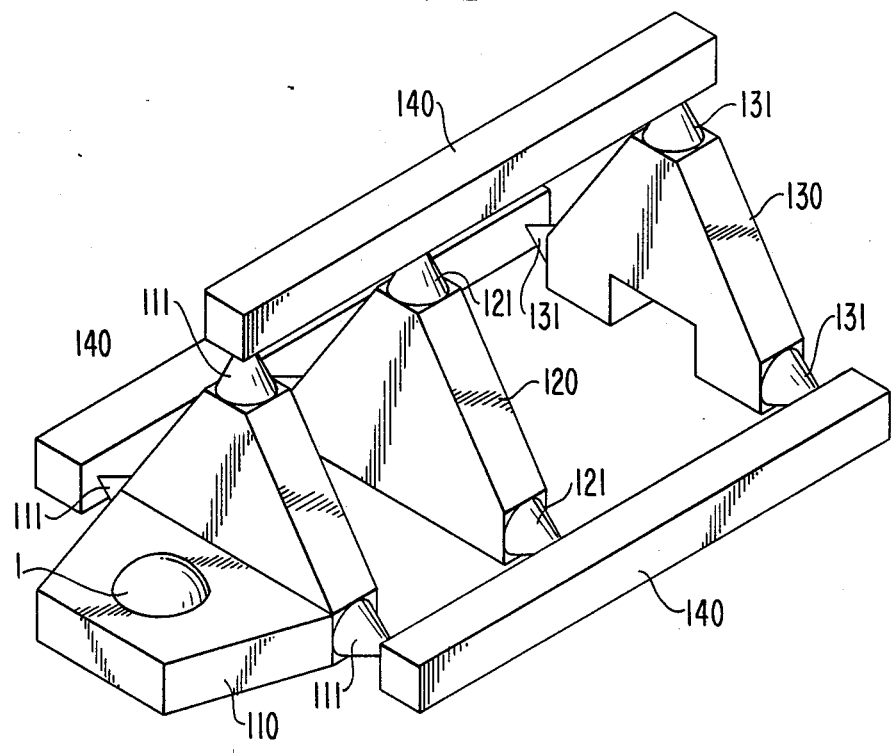
FIG. 2 is a perspective view of a mechanism of a drive device for moving an optical pickup according to the present invention.

FIG. 2 shows in perspective a mechanism of a drive device for moving an optical pickup according to the present invention.

As shown in FIG. 2, the mechanism includes a first reference plate 110, a second reference plate 120, and a third reference plate 130. The first reference plate 110 supports thereon an objective lens 1 and three angularly spaced pivots 111 each comprising a conical protection. Each of the second and third reference plates 120, 130 also has three angularly spaced pivots 121, 131 each comprising a conical projection. Three angularly spaced connecting arms 140 interconnect the pivots 111, 121, 13!, and are pivotally supported by these pivots 111, 121, 131. The pivots 111, 121, 131 are equally spaced between adjacent ones on the connecting arms 140. Adjustments are made such that the mass moment of tho first reference plate 110 with respect to the second reference plate 120 is equal to the mass moment of the third reference plate 130 with respect to the second reference plate 120. Such mass moment adjustments can be performed, for example, by increasing or reducing the mass of the third reference plate 130 with a recess of a desired size defined in the third reference plate 130.

The drive device of the invention includes the above mechanism of FIG. 2 and also drive mechanisms. Such drive mechanisms are however omitted from illustration in FIG. 2 for an easier understanding of the mechanism shown in FIG. 2.

A drive device of the invention, including drive mechanisms, will be described with reference to FIG. 3.

Figure 3:
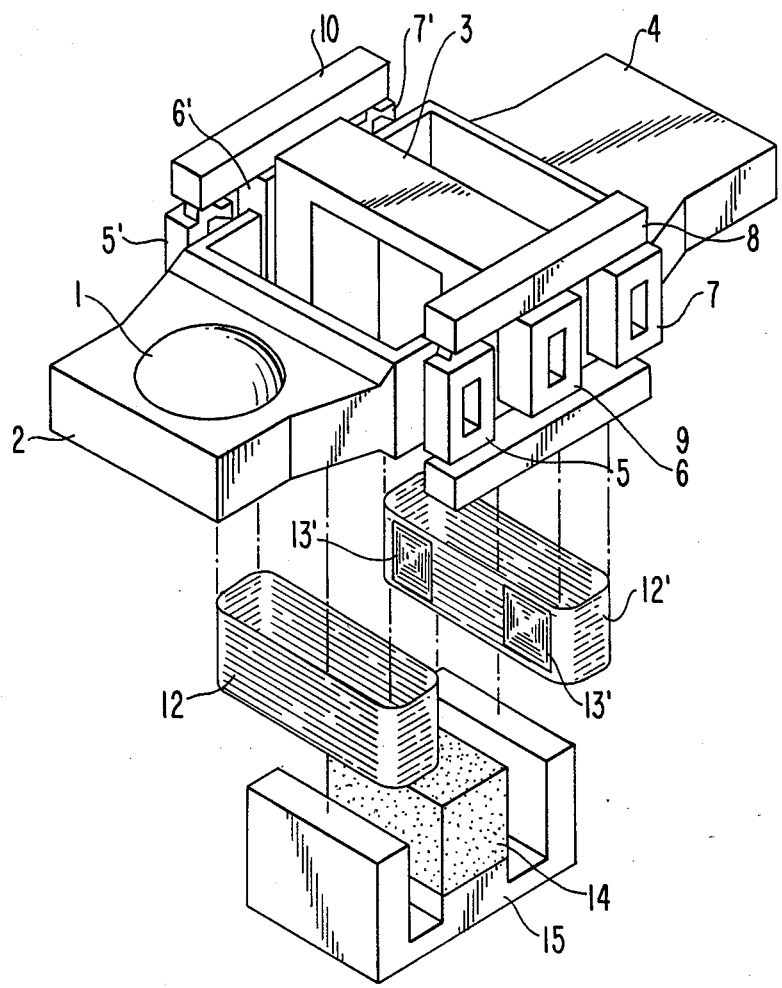
FIG. 3 is an exploded perspective view of the drive device of the invention.

As illustrated in FIG. 3, first, second, and third reference plates 2. 3. 4 are arranged at spaced intervals with an objective lens 1 disposed on the upper surface of the first reference plate 2. Joints 5, 5' which are horizontally swingable by respective hinges 30, 31 (FIG. 5(A)) are hinged to lateral sides, respectively, of the first reference plate 2, and similarly joints 6, 6' and 7, 7' are horizontally swingably hinged to lateral sides, respectively, of the second and third reference plates 3, 4, by means of hinges 32, 33 and 34, 35. A connecting arm 8 interconnecting upper surfaces of the joints 5, 6, 7 is vertically swingably hinged to the joints 5, 6, 7 by means of hinges 20, 21, 22, respectively, and another connecting arm 9 is also vertically swingably hinged to lower surfaces of tho joints 5, 6, 7 by means of respective hinges 23, 24, 25. Likewise, a connecting arm 10 is vertically swingably hinged to upper surfaces of the joints 5', 6', 7', respectively, and a connecting arm (not shown) is vertically swingably hinged to lower surfaces of the joints 5', 6', 7'. The first and third reference plates 2, 4 have recesses defined in the sides thereof which face the second reference plate 3 and opening toward the second reference plate 3. A vertical driver coil 12 and a horizontal driver coil 13 (not shown) are disposed in the recess of the first reference plate 2, whereas a vertical driver coil 12' and a horizontal driver coil 13' are disposed in the recess of the third reference plate 4. The second reference plate 3 also has a downwardly opening recess in which a permanent magnet 14 is fitted. The permanent magnet 14 is connected to a yoke 15 which has legs inserted respectively in the vertical driver coils 12, 12', providing magnetic poles.

When the vertical driver coils 12, 12' are energized, the first and third reference plates 2, 4 are subjected to vertical electromagnetic forces produced by the vertical driver coils 12, 12' in conjunction with magnetic forces from the permanent magnet 14. By energizing the vertical driver coils 12, 12' in such a manner to generate the electromagnetic forces in opposite directions from the vertical driver coils 12, 12', the first reference plate 2 is vertically driven. When the horizontal driver coils 13, 13' are energized, the first and third reference plates 2, 4 are subjected to horizontal electromagnetic forces produced by the horizontal driver coils 13, 13' in coaction with magnetic forces from the permanent magnet 14. By energizing the horizontal driver coils 13, 13' in such a manner to generate the electromagnetic forces in opposite directions from the horizontal driver coils 13, 13', the first reference plate 2 is horizontally driven. The first reference plate 2 can thus be moved vertically and horizontally with respect to the second reference plate 3 by controlling the amount and direction of energization of the vertical driver coils 12, 12' and the horizontal driver coils 13, 13'.

The manner in which the first reference plate 2 is moved will be described with reference to FIGS. 4(A), 4(B), 5(A), and 5(B).

The permanent magnet 14, the yoke 15, the vertical driver coils 12, 1240 , and the horizontal driver coils 13, 13' are omitted from illustration in FIGS. 4(A), 4(B), 5(A), and 5(B).

Figure 4A:
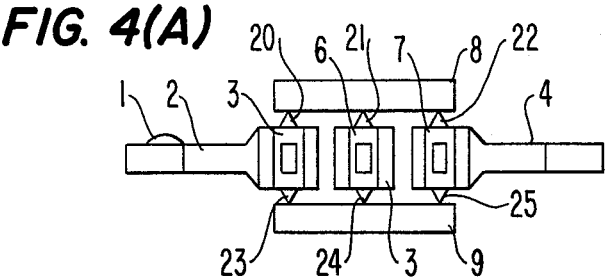
FIGS. 4(A) and 4(B) are side elevational views showing the manner in which the drive device is displaced.
Figure 4B:
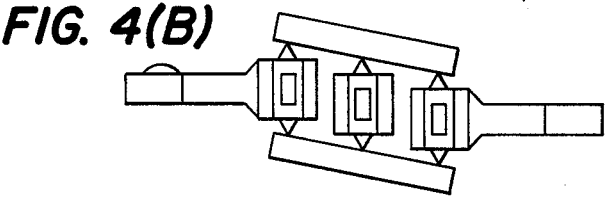

FIG. 4(A) shows the first reference plate 2 in a neutral position, whereas FIG. 4(B) shows the first reference plate 2 in an upwardly driven condition. By applying an upwardly driving force to the first reference plate 2 and applying a downwardly driving force to the third reference plate 4, the first reference plate 2 is moved upwardly with respect to the second reference plate 3. When the first reference plate 2 is thus moved, the first and third reference plates 2, 4 are translated or moved parallel to each other since the hinges 20, 21, 24, 23 and the hinges 21, 22, 25, 24 jointly form parallelograms. The first reference plate 2 must be translated since if it were inclined with respect to a reflected light beam from a disc surface, then the detection of the light beam by the optical pickup would be varied. The third reference plate 4 must also be translated since if a couple were produced by its rotation about its own axis, then the accuracy with which the first reference plate 2 is stopped would be lowered.

Figure 5A:
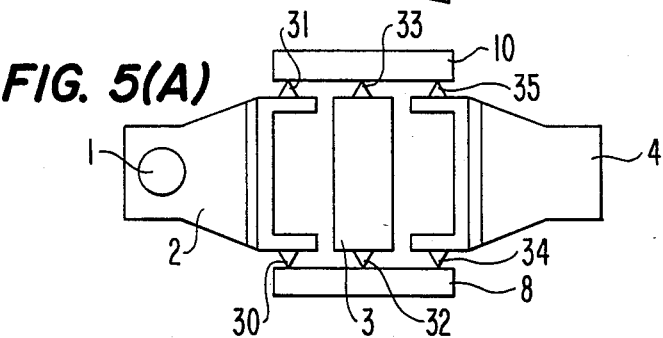
FIGS. 5(A) and 5(B) are plan views showing the manner in which the drive device is displaced.
Figure 5B:
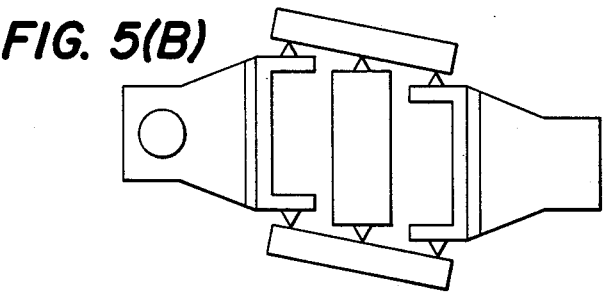

In FIGS. 5(A) and 5(B), the first reference plate 2 is moved from the neutral position of FIG. 5(A) to the position of FIG. 5(B) by imposing mutually opposite horizontal forces on the first and second reference plates 2, 4. At this time, the first and third reference plates 2, 4 are translated or moved parallel to each other since the hinges 31, 33, 32, 30 and the hinges 33, 35, 34, 32 jointly form parallelograms. The first and third reference plates 2, 4 can be moved in directions opposite to the directions of their movement shown in FIGS. 4(B) and 5(B).

By equalizing the mass moments of the first and third reference plates 2, 4 with the second reference plate 3, the moment of inertia acting on the first reference plate 2 and the moment of inertia acting on the third reference plate 4 is held in equilibrium or a state of balance when external vibrations or shocks are applied to the reference plates. Therefore, no forces tending to rotate the second reference plate 3 are produced. The first, second, and third reference plates 2, 3, 4 thus remain in the same positional relationship Accordingly, the detection of the light reflected from a disc is not affected by external vibrations or shocks. Furthermore, inasmuch as gravity-induced moments acting on the first and third reference plates 2, 4 are counterbalanced with respect to the second reference plate 3, it is not necessary to apply any bias voltage to the vertical driver coils 12, 12' for holding the first reference plate 2 in the neutral position. The amount of electric power consumed by the drive device of the invention can thus be reduced.

In FIGS. 3, 5(A), and 5(B), the distance between the first and second reference plates 2, 3 and the distance between the third and second reference plates 4, 3 are shown as being substantially equal to each other. However, the distance between the third and second reference plates 4, 3 may be increased while maintaining the mass moments of the first and third reference plates 2, 4, and the movement of the first reference plate 2 may be controlled primarily by the vertical driver coil 12' and the horizontal driver coil 13, for increasing the accuracy to position the first reference plate 2.

A hinge assembly will be described below with reference to FIG. 6.

Figure 6:
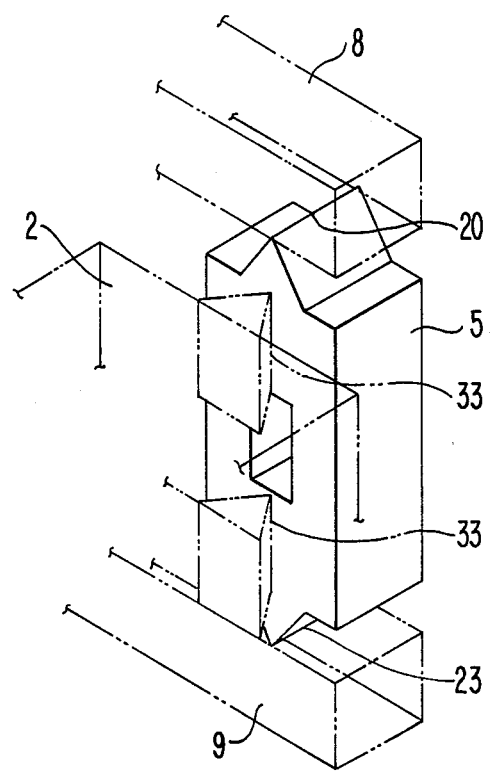
FIG. 6 is a perspective view of a hinge assembly of the drive device.

FIG. 6 shows the joint 5 in perspective. The joint 5 is held in line-to-line contact with the hinges 33 on the first reference plate 2, with the connecting arm 8 through the hinge 20, and with the connecting arm 9 through the hinge 23. The hinge assembly illustrated in FIG. 6 is molded of synthetic resin by injection molding, using a single mold. The hinges are integrally joined to the joint 5 and the connecting arms 8, 9 through the narrow line-to-line contact portions which can elastically be deformed to allow relative movement of the reference plate 2, the joint 5, and the connecting arms 8, 9. The first, second, and third reference plates 2, 3, 4, the connecting arms, and the joints can thus be formed as an integral unitary structure. The drive device of the present invention can be manufactured inexpensively since it can be made up of a reduced number of separate components.

While the embodiments have been described in which three and four connecting arms are employed, a drive device having five or more connecting arms can also perform the function the present invention is intended to achieve.

Although certain preferred embodiments have been shown and described, it should be understood that many changes and modifications may be made therein without departing from the scope of the appended claims.

We claim:

1. A drive device for driving an optical pickup for recording information on or reading information from an information storage medium, said drive device comprising:
    first, second, and third reference plates disposed respectively in first, second, and third successive planes parallel to each other;
    an optical pickup mounted on said first reference plate;
    at least three pivotal support members parallel to each other and disposed in respective different planes, said pivotal support members interconnecting said first, second, and third reference plates and pivotally supporting said first, second, and third reference plates through respective pivots disposed in said first, second, and third planes, respectively;
    a first drive mechanism for driving said first and third reference plates in first parallel directions with respect to said second reference plate; and
    a second drive mechanism for driving said first and third reference plates in second parallel directions transverse to said first parallel directions with respect to said second reference plate.

2. A drive device according to claim 1, wherein the mass moment of said first reference plate with respect to the mass moment of said second reference plate is equal to the mass moment of said third reference plate with respect to said second reference plate.

3. A drive device according to claim 1, wherein said first, second, and third reference plates are interconnected by three pivotal support members parallel to each other and disposed in respective different plates.

4. A drive device according to claim 1, wherein said first, second, and third reference plates are interconnected by four pivotal support members parallel to each other and disposed in respective different plates.

5. A drive device according to claim 3, wherein the distance between said first and second reference plates is equal to the distance between said second and third reference plates.

6. A drive device according to claim 3, wherein the distance between said first and second reference plates is different from the distance between said second and third reference plates.

7. A drive device according to claim 5, wherein said first and second drive mechanisms apply driving forces to said first reference plate.

8. A drive device according to claim 5, wherein said first and second drive mechanisms apply driving forces to said third reference plate.

9. A drive device according to claim 5, wherein said first and second drive mechanisms apply driving forces to at least one of said pivotal support members.

10. A drive device according to claim 7, wherein said first, second, and third reference plates, and said pivotal support members are formed of synthetic resin as an integral unitary structure by injection molding.

11. A drive device according to claim 2, wherein said first, second, and third reference plates are interconnected by three pivotal support members parallel to each other and disposed in respective different plates.

12. A drive device according to claim 2, wherein said first, second and third reference plates are interconnected by four pivotal support members parallel to each other and disposed in respective different plates.

13. A drive device according to claim 4, wherein the distance between said first and second reference plates is equal to the distance between said second and third reference plates.

14. A drive device according to claim 4, wherein the distance between said first and second reference plates is different from distance between said second and third reference plates.

15. A drive device according to claim 6, wherein said first and second drive mechanisms apply driving forces to said first reference plate.

16. A drive device according to claim 6, wherein said first and second drive mechanisms apply driving forces to said third reference plate.

17. A drive device according to claim 6, wherein said first and second drive mechanisms apply driving forces to at least one of said pivotal support members.

18. A drive device according to claim 8, wherein said first, second, and third reference plates, and said pivotal support members are formed of synthetic resin as an integral unitary structure by injection molding.

19. A drive device according to claim 9, wherein said first, second, and third reference plates, and said pivotal support members are formed of synthetic resin as an integral unitary structure by injection molding.

* * * * *